3,677,997
BOUNCING PUTTIES
Wolfgang Kaiser, Adrian, Mich., and Siegfried Nitzsche, Ernst Wohlfarth, Alois Strasser, and Paul Hittmair, Burghausen, Upper Bavaria, Germany, assignors to Wacker-Chemie G.m.b.H., Munich, Germany
No Drawing. Filed Feb. 5, 1971, Ser. No. 113,104
Claims priority, application Germany, Feb. 6, 1970, P 20 05 530.5
Int. Cl. C08g 51/34
U.S. Cl. 260—332 SB
5 Claims

ABSTRACT OF THE DISCLOSURE

Bouncing putty based on organosiloxane-boron compound mixtures and reaction products are improved by the addition of polyglycols. The improved bouncing putty does not become tacky upon extended kneading or use.

---

This invention is directed to an improved organosiloxane-boron composition widely known as bouncing putty and containing certain polyglycols.

A unique class of materials based on linear diorganopolysiloxanes and various boron compounds have long been known and sold by the silicone industry. These materials were called "bouncing putty" in the book "Silicones and Their Uses," 1954, published by McGraw-Hill Book Co., Inc., by R. R. McGregor at pages 186 and 187. As noted by McGregor, these materials are also known as "Silly Putty," "Crazy Clay" and other such catch-phrases. The unique aspect of the product is that although it can be kneaded and worked as a putty-like material, it responds to sharp blows by bouncing and/or shattering. Thus, a ball of "bouncing putty" can be dropped on the floor from a height of say 6 feet and will bounce (i.e. recover) to a height of almost 5 feet and if struck sharply with a hammer, the ball will shatter into many fragments almost as though made of a glass-like material.

These well known bouncing putties are fully documented as to preparation and properties in U.S. Pats. No. 2,431,878, No. 2,541,851 and No. 3,350,344, all of which are specifically incorporated herein by reference thereto. These previously known bouncing putties possess the unfavorable property of being tacky or becoming tacky upon extended working or kneading. Thus, when these bouncing putties are employed as a means for exercising or strengthening muscles as in physical therapy, the bouncing putty becomes tacky after extended use. This is true even when the bouncing putty contains glycerine, Vaseline, paraffins with high melting points and/or waxes.

The primary object of this invention is to introduce a novel bouncing putty which will not become tacky after extended kneading. A further object is an improved bouncing putty for use in physical therapy work to strengthen muscular control and performance, said bouncing putty being capable of use and reuse over long periods of time without becoming tacky. Other objects and advantages of this invention are detailed in or will be apparent from the disclosure and claims following.

This invention is directed to a bouncing putty based on boron-siloxane compositions containing polyglycols, etherified polyglycols, esterified polyglycols or esterified-etherified polyglycols in proportions of from 1 to 20 percent by weight based on the weight of the bouncing putty. Best results are achieved employing 2 to 8 percent of the stated additive on the defined basis.

The products of this invention employ the siloxane polymers, boron compounds and known additives previously and widely known in the art and are prepared by the methods previously known and employed in the art. It is not necessary to a complete disclosure and would be redundant to one skilled in the art to list the siloxanes, boron compounds and known additives or to recite known methods for producing bouncing putty in this application. Nevertheless, in general, the siloxane-boron materials employed can be prepared by reacting essentially linear diorganopolysiloxanes, such as dimethylpolysiloxanes, with compounds of boron containing oxygen such as boric acid, alkyl borates, boric acid anhydride and the like. This reaction is preferably carried out in the presence of a Lewis acid such as ferric chloride, at 40° to 250° C. The product obtained is neutralized and is mixed with fillers and, if desired, with other common useful additives for bouncing putties and with the additive of the present invention. The neutralization of the Lewis acid can be carried out by any desired means such as by addition of an ammonium salt of carbonic acid. The additives, including fillers, aromatics, pigments, dyes soluble in the system and, of course, the defined polyglycols, can be added in any desired sequence. The fillers include fume silicas, titanias, barium sulfate, diatomaceous earth, and other known pulverulent materials so used. Of course, medicaments and anti-bacterial agents can be employed if desired.

Other additives useful herein include softeners and plasticizers such as long chain carboxylic acids, such as oleic acid and mixtures of monocarboxylic acids having 9 to 11 carbon atoms per molecule with the carboxyl groups tertiarily bonded in 90% of the molecules, as well as lubricants.

The unique ingredient in the bouncing putties of this invention are polyglycols which can be etherified, esterified or both. Excellent polyglycols for this use are those commercially available polyglycols of the general formula $RO\{(CHR')_mO\}_nH$ where R is a monovalent hydrocarbon radical of 1 to 30 carbon atoms, R' is hydrogen or an alkyl radical of 1 to 18, preferably 1 to 6, carbon atoms, $m$ is 2, 3, 4 or 5, and $n$ is 2 to 100, preferably 4 to 50.

R can be any monovalent hydrocarbon radical of 1 to 30 carbon atoms as this term is usually employed, thus including alkyl radicals, alkenyl radicals, cycloaliphatic radicals, aryl radicals, aralkyl radicals and alkaryl radicals. Examples of such radicals are widely published in the art and reference can be made to almost any organic chemistry text as well as chemical dictionaries and such patents as U.S. Pats. No. 2,486,162 and No. 3,509,081, inter alia. Specific examples of R include lauryl, myristyl, cetyl, stearyl, oleyl, cyclohexyl, phenyl, octylphenyl, nonylphenyl, tributylphenyl, dodecylphenyl, octadecenyl and cyclooctadecenyl.

R' is hydrogen or an alkyl radical. Although R' can be a higher alkyl radical, commercially available materials generally contain R' groups of 1 to 6 carbon atoms and particularly $CH_3$.

Examples of polyglycols operable herein include polypropyleneoxide and polyethyleneoxide condensation products which may be represented empirically by the general formula $HO(C_2H_4O)_x(C_3H_6O)_y(C_2H_4O)_zH$ (e.g. the "Pluronics" sold under this registered trademark by Wyandotte Chemicals Corporation).

The polyglycols which have been etherified, esterified or both include well known organopolysiloxane-polyoxyalkylene copolymers. Examples of the types of such copolymers useful herein can be represented by the formulae (I) $R''_3SiO(R''ASiO)_pSiA''_3$, (II) $HO(R''ASiO)_pH$ and (III) $R''_2ASiO(R''ASiO)_pSiR''_2A$ where each R'' is a monovalent hydrocarbon radical, halogenated hydrocarbon radical or cyanoalkyl radical of 1 to 30, preferably 1 to 18, carbon atoms, most generally methyl, ethyl, propyl, phenyl, vinyl, 3,3,3-trifluoropropyl, halogenophenyl or cyanoalkyl, $p$ is 1 to 50, and A is a unit of the general formula $-\{(CHR')_mO\}_nR'''$ wherein $R'$, $m$ and $n$ are as above defined and $R'''$ is H, hydrocarbyl, acyl, trihydrocarbylsilyl or $\{-R''ASiO\}_pB$ where $R''$, A and $p$ are as above defined and B is $-SiR'''_3$, A or $-SiR''_2A$ where A and $R''$ are as above defined. Copolymers, particularly block copolymers, of dihydrocarbylsiloxanes and polymer units of the general formula $$-Si(O_gA)_iR''_hO_{\frac{4-i-h}{2}}$$

where A and $R''$ are as above defined and $g$ is 0 or 1, $i$ is 1, 2 or 3, $h$ is 0, 1 or 2 and $h+i$ is 1, 2 or 3, in addition to units of the formula $$R_{h'}SiO_{\frac{4-h'}{2}}$$

where R is as above defined and $h'$ is 0, 1, 2 or 3 are also operable. The most familiar example of these copolymers can be defined by the general formula $$C_2H_5Si\{O(Me_2SiO)_6(C_nH_{2n}O)_zC_4H_9\}_3$$

where $n$ is 2 or 3, $z$ is 20 to 40, preferably 29 to 31, and contains approximately equal molar weight of ethylene oxide and propylene oxide units.

The polysiloxane-polyoxyalkylene copolymers are well known in the art and can be further defined by reference to such U.S. Pats. as No. 3,402,192; No. 2,846,458; No. 2,834,748 and No. 3,518,288 as well as Belgian Pats. No. 740,113 and No. 739,312 and Canadian Pat. No. 847,935, all incorporated herein by specific reference thereto.

The bouncing putties of this invention can be used as toys for children, damping media as in furniture leveling devices and shock absorbers, power conversion and transmission materials as in recording machines and particularly as a material for muscle development and strengthening in therapeutic medicine.

The following examples are intended to assist one skilled in the art to better understand and practice the present invention. The scope of the invention is not limited by the examples but is defined in the appended claims. All parts and percentages are based on weight unless otherwise stated and all viscosities were measured at 25° C.

EXAMPLE 1

(A) A mixture of 100 parts of hydroxyl endblocked dimethylsiloxane having a viscosity of 95 cp. and 3 parts finely powdered, water-free boric acid catalyzed by 0.005 part of water-free ferric chloride was heated at 20 mm. Hg (abs.) at 70° C. for five hours to obtain a stiff, putty-like material which was difficult to knead. This was followed by further heating at 150° C. for 15 hours. The catalyst was neutralized by admixing therein 1 part of ammonium bicarbonate and heating to the 80° to 100° C. range until no more ammonia is released.

(B) The polymer obtained in (A) above was employed to prepare a mixture of 100 parts of said polymer, 0.2 part of a commercially available monocarboxylic acid mixture of acids containing 9 to 11 carbon atoms per molecule with at least 90% of the molecules having tertiary bonding (available as Versatic 911 acid from Shell Chemical Co.), then with 6.57 parts fume silica and 22 parts barium sulfate. Finally, 100 parts of the material so obtained was mixed with 4 parts of coconut oil alcohol etherified with a polyglycol containing 8 ethylene oxide units per molecule (Genapol CO80). This bouncing putty was not tacky and did not become tacky after long and extensive kneading with the hand in contrast to the same material but without the polyglycol which became tacky after only a few minutes of kneading with the hand.

EXAMPLE 2

When Example 1 was repeated, similar results were achieved by replacing the coconut oil alcohol etherified with a polyglycol containing 8 ethylene oxide units per molecule with any of the following: high molecular weight, non-ionic surfactants prepared by condensing ethylene oxide with the condensation product of propylene oxide with propylene glycol; $Me_3SiO(MeASiO)_{25}SiMe_3$ where Me is methyl and A is $$CH_3\underset{\underset{O}{\|}}{C}O(C_2H_4O)_{30}-$$

$$CH_3O(C_2H_4O)_{17}(C_3H_6O)_{13}-$$

$$C_4H_9(C_3H_6O)_{12}(C_2H_4O)_{15}(C_4H_8O)_3-$$

or $$H(C_2H_4O)_{20}(C_3H_6O)_{20}-, HO(MeASiO)_{30}H$$

where A is as above defined, $$Me_2ASiO(AMeSiO)_{20}(Me_2SiO)_{20}SiMe_2A$$

where A is as above defined, or $$C_2H_5Si\{O(Me_2SiO)_6(C_2H_4O)_{17}(C_3H_6O)_{13}C_4H_9\}_3$$

That which is claimed is:

1. In a bouncing putty based on polysiloxane-boron compound reaction products, the improvement consisting of incorporating therein as an additive from 1 to 20 parts by weight per 100 parts by weight of bouncing putty of a fluid of the genral formula $RO\{(CHR')_mO\}_nH$ where each R is a monovalent hydrocarbon radical of 1 to 30 carbon atoms, $R'$ is a hydrogen atom or alkyl radical of 1 to 6 carbon atoms, $m$ is 2, 3, 4 or 5 and $n$ has a value from 4 to 50.

2. The bouncing putty of claim 1 wherein the additive is present in proportion of 2 to 8 parts by weight per 100 parts by weight of bouncing putty.

3. The bouncing putty of claim 1 wherein the polysiloxane-boron compound is prepared by reacting an α,ω-dihydroxy-dimethylpolysiloxane fluid with an alkyl borate or boric acid.

4. The bouncing putty of claim 3 also containing a reinforcing silica, diatomaceous earth or both.

5. The bouncing putty of claim 1 also containing one or more of antibiotics, disinfectants and fillers.

References Cited

UNITED STATES PATENTS

| | | | |
|---|---|---|---|
| 2,644,805 | 7/1953 | Martin | 260—33.4 SB X |
| 2,541,851 | 2/1951 | Wright | 260—33.4 SB X |
| 2,852,484 | 9/1958 | New | 260—33.4 SB |
| 3,555,063 | 1/1971 | Nakajima et al. | 260—824 RX |

LEWIS T. JACOBS, Primary Examiner

U.S. Cl. X.R.

260—33.4 SB